Figure 1:
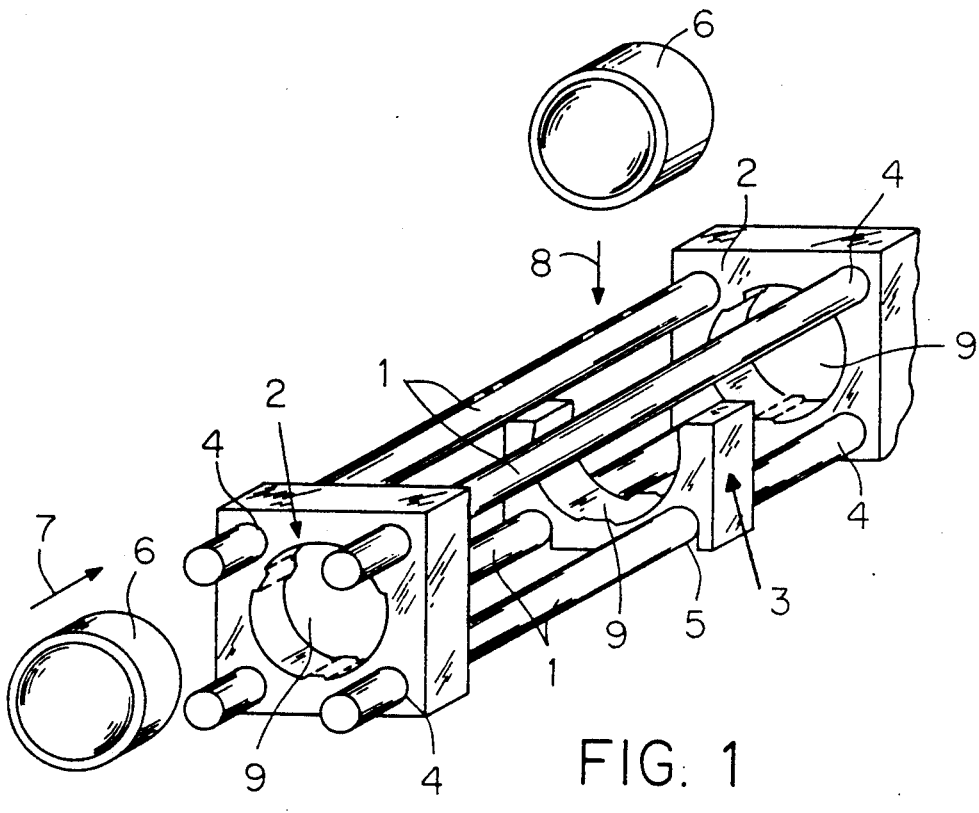

United States Patent [19]

Klingner

[11] Patent Number: 5,035,333

[45] Date of Patent: Jul. 30, 1991

[54] ARRANGEMENT FOR CONSTRUCTING A MICRO-OPTIC BENCH

[75] Inventor: Hartmut Klingner, Göttingen, Fed. Rep. of Germany

[73] Assignee: Spindler & Hoyer GmbH & Co., Göttingen, Fed. Rep. of Germany

[21] Appl. No.: 496,443

[22] Filed: May 20, 1983

[30] Foreign Application Priority Data

May 24, 1982 [DE] Fed. Rep. of Germany ....... 3219399

[51] Int. Cl.$^5$ .............................................. A47F 7/00
[52] U.S. Cl. ....................................... 211/41; 211/189
[58] Field of Search .......................... 211/41, 189, 74; 206/445, 454, 449; 294/139

[56] References Cited

U.S. PATENT DOCUMENTS

| 2,826,333 | 3/1958  | Rodemich        | 294/143 X |
| 3,113,363 | 12/1963 | Fyvie           | 211/70.8  |
| 3,539,874 | 11/1970 | Swanson         | 211/41 X  |
| 3,856,472 | 12/1974 | Schweritzer et al. | 211/41 |
| 3,875,711 | 4/1975  | Palmer          | 211/182 X |
| 3,889,815 | 6/1975  | Merle           | 211/41    |
| 3,896,743 | 7/1975  | Parieste        | 211/182 X |
| 3,941,273 | 3/1976  | Dalencon        | 211/41 X  |
| 4,093,076 | 6/1978  | Newton          | 211/74    |
| 4,234,094 | 11/1980 | Jorgensen       | 211/106 X |

FOREIGN PATENT DOCUMENTS

| 2456500 | 6/1975  | Fed. Rep. of Germany ........ 211/41 |
| 2636657 | 2/1978  | Fed. Rep. of Germany . |
| 340675  | 10/1959 | Switzerland . |
| 465328  | 12/1968 | Switzerland . |

Primary Examiner—Robert W. Gibson, Jr.
Attorney, Agent, or Firm—Max Fogiel

[57] ABSTRACT

An arrangement for constructing a micro-optic bench that has rods (1) and mounts (2 or 3) for holding optical elements. The mounts are provided with perforations (4 or 5) through which the rods extend. The mounts can be locked into position on the rods by means of positive and non-positive snap-together fastenings in the vicinity of the perforations. The fastenings secure the mounts in place on the rods in such a way that they cannot be accidentally displaced. The arrangement or set can be assembled or disassembled without tools or supplementary parts.

8 Claims, 3 Drawing Sheets

ARRANGEMENT FOR CONSTRUCTING A MICRO-OPTIC BENCH

The invention concerns an arrangement for constructing a micro-optic bench that has rods and mounts for holding optical elements, an arrangement in which the mounts are providing with perforations, through which the rods extend, and in which the mounts can be locked into position on the rods.

An arrangement or set of this type is known from German Auslegeschrift 2 636 657. Its parts include rods and mounts. The mounts are square plates with a perforation, through which the rods extend, at each corner. The set can be assembled to admit an optical beam for instance. The mounts have a relatively large opening, in which optical elements like lenses, filters, mirrors, etc. can be positioned, at the center. Separate pins are included in the set to lock the mounts onto the rods. The pins fit into recesses tangent to the perforations in the mounts and the perforations and recesses overlap enough to ensure a reliable lock. Although this method of assembly is effective, the pins represent additional parts that have to be kept at hand.

Another type of set is known in which the mounts have threaded bores perpendicular to the longitudinal axis of the rods, on which they are secured in position with set screws that screw into the bores. Since other set screws are employed to secure the optical elements in the holes, a mount of this type necessitates a large number of threaded bores and separate screws. Both the plate-type mounts and the rods are made out of metal, preferably aluminum. Manufacturing the mounts, especially introducing the bores and threading the screws, is labor-intensive and expensive.

Swiss Patent 465 328 discloses a set for assembling at least two support and guide rods into a rack. The rods feature a two-part shell that can be screwed together to form locking positioning channels. The set also has rods and mounts to hold various instruments. Since the rods form parallel or multiple guides for the mounts, the precision with which the components can be positioned depends on the tolerances to which they and the guide rods can manufactured. The components in this set are also held in place with set screws, requiring a considerable amount of threading.

Components in the field of optics are usually manufactured to strict tolerances and positioned by means of threads and screws, which must in certain applications operate with a precision justifying the high manufacturing costs that prohibit the devices from being used in fields where less precision is required.

The present invention is intended as a development of the aforesaid type of arrangement or set that can be assembled into a micro-optical bench without tools and without supplementary parts like separate pins or screws. It is intended to be simple to operate. It will be possible to add mounts to or remove then from the set once it has been assembled and without disassembling it. Since the set is also intended to be inexpensive to manufacture, it ought to be applicable to fields in which the cost of known sets has been prohibitive.

This objective is achieved in accordance with the invention by positive and non-positive snap-together fastenings in the vicinity of the perforations through the mounts, fastenings that will, without supplementary means of attachment, secure the mounts in place on the rods in such a way that they cannot be accidentally displaced. Since the mounts and the rods are strictly snapped together, they can be fastened together without tools or supplementary means of attachment. The mounts will be shaped, especially in the vicinity of the perforations, to ensure easy and rapid assembly without being subject to accidental displacement.

The set can be employed for any application in which very high precision is not a prerequisite. It can be employed in combination with optical elements from known types of set. The set is especially practical for assembling optical instruments like magnifiers, telescopes, simple microscopes, projectors, light barriers, illuminating devices, etc.

Its range of application is mainly defined by the dimensional stability of the materials out of which the rods and mounts are made. Whereas the rods will preferably the round—tubular or solid— shapes precisely drawn from a material like steel, brass, a light alloy, etc., it is preferable to manufacture the mounts out of injection-molded plastic.

The circumference of the perforations through the mounts can be either continuous or discontinuous, with one side of the perforation open. When it is continuous, the set will have to be assembled by inserting the rods axially through the mounts. When the circumference of the perforations is discontinuous, the mounts can either be positioned on the rods from the side or rotated into position.

Both the perforations with a continuous and those with a discontinuous circumference have knobs, ribs, or similar elevations distributed along their circumference to establish a snap-together fastening. The elevations are distributed as uniformly as possible along the circumference. The elevations describe a circle with a diameter that is preferably shorter than that of the rods, whereas the depressions between the elevations describe a concentric circle with a diameter that is longer. The elevations in the perforations with a discontinuous circumference are distributed along more than 180° of their circumference.

The mounts may have four or even two or three perforations.

The area around the perforations in the mounts employed with all embodiments of the invention must be elastic enough to ensure a satisfactory snap-together fastening. Plastic is especially appropriate material for the mounts.

The set is initially assembled and primarily secured with mounts containing four perforations with a continuous circumference, preferably at each end of the rods. The circumference of the perforations through mounts that are intended to be positioned on or taken off the rods after the arrangement or set has been assembled must be discontinuous.

The perforations with a discontinuous circumference may have lateral accesses so that the mount can be snapped into position by rotating it. Since the snap-together fastenings on the mounts are preferably intended to fit onto rods drawn out round, the perforations and elevations must accordingly be of an appropriate shape and size.

Figure 2:
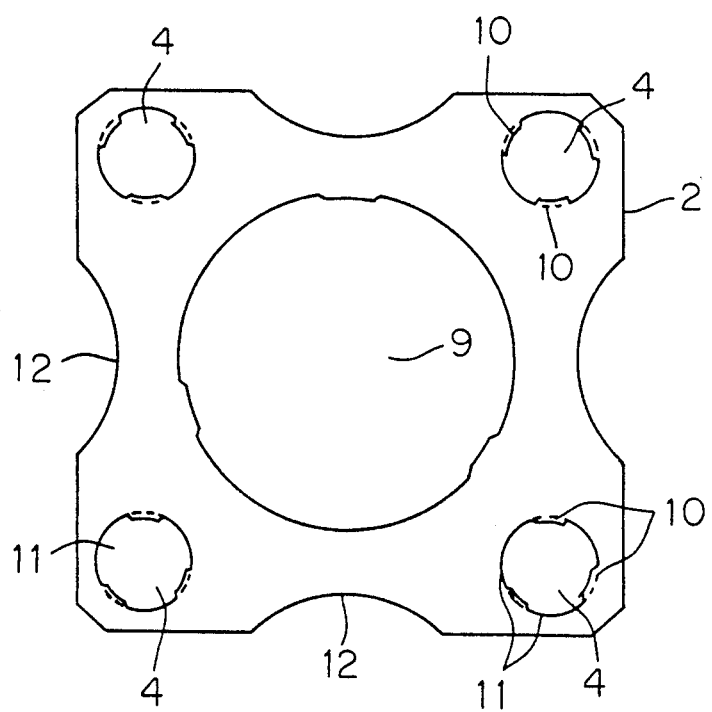
Figure 3:
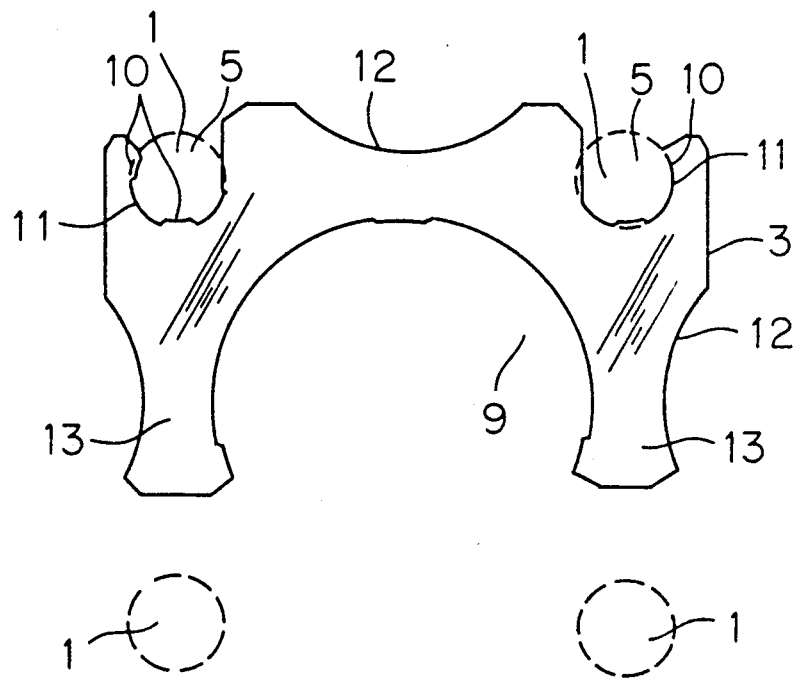
Figure 4:
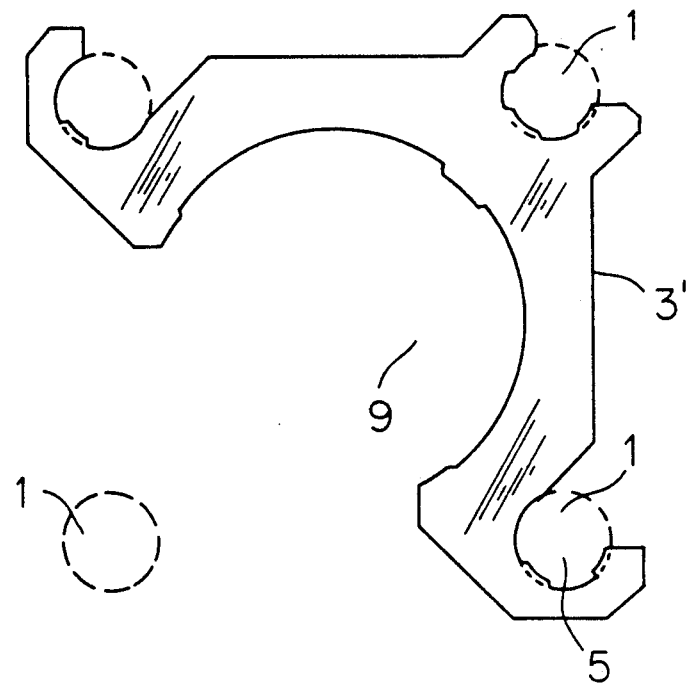
Figure 5:
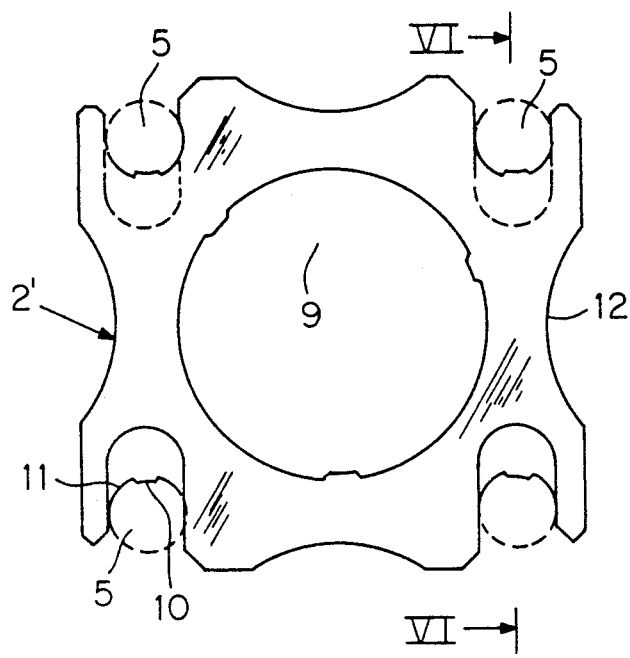
Figure 6:
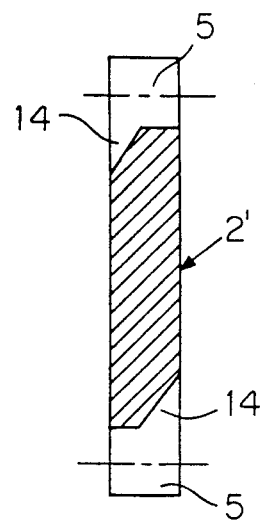
Figure 7:
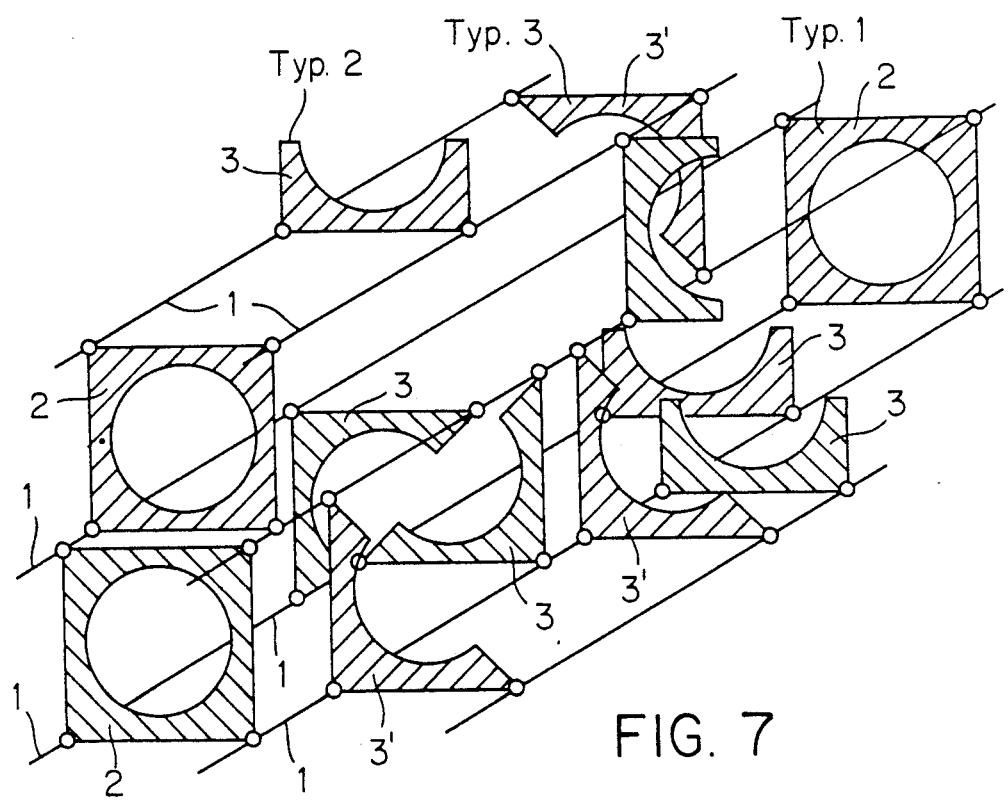

Some preferred embodiments of the invention will now be specified by way of example with reference to the drawings, in which FIG. 1 is a perspective view of a simple micro-optical bench assembled out of a set in accordance with the invention, FIG. 2 is a view of one embodiment of a mount in accordance with the invention, FIG. 3 is a view of another embodiment of a mount in accordance with the invention, FIG. 4 is a view of a third embodiment of a mount in accordance with the invention, FIG. 5 is a view of a fourth embodiment of a mount in accordance with the invention, FIG. 6 is a section along the line VI—VI in FIG. 5, and FIG. 7 is a schematic perspective view illustrating how various mounts can be positioned in an assembled set.

FIG. 1 shows all or part of a simple micro-optical bench of the type that can be assembled with a set in accordance with the invention. Two mounts 2 are first slid onto four rods 1 as illustrated in detail in FIG. 2. Between these two mounts 2 is another mount 3 of the type illustrated in a top view in FIG. 2. Mount 3 can be positioned on rods 1, and hence inserted into the set, even after the set has been initially assembled by positioning mounts 2 on the rods, establishing their spatial relation. The circumference of the perforations 4 through mounts 2 is continuous and that of the perforations 5 through mounts 3 discontinuous. Mounts 2 must be positioned on the rods by inserting the rods axially through the perforations 4 with a continuous circumference. Mounts 3 are positioned on the rods from the side by fitting their perforations 5 with a discontinuous circumference over the rods.

Simple optical elements 6 can be inserted in the direction indicated by arrows 7 or 8 into openings 9 in mounts 2 or 3, which are concentric with the optical axis of a modulus established by rods 1.

The mount 2 illustrated in FIG. 2 is injection-molded out of plastic and is in the form of a square plate with an opening 9 at the center and a perforation 4 with a continuous circumference at each corner. Knobs, ribs, or similar elevations 10 are uniformly distributed, separated by depressions 11, along the circumference of each perforation 4. The shape and size of perforations 4 (and of perforations 5, illustrated in FIGS. 3–6), with their elevations and depressions, are coordinated with the shape and size of the cross-section of the round rods 1 to form snap-together fastenings 10 and 11. The circumference of mounts 2 as a whole is provided with indentations 12, not only to secure satisfactory elasticity in the vicinity of snap-together fastenings 10 and 11, but also to make the assembly more compact with a lateral connection in the path of the beam of light.

FIG. 3 illustrates a mount 3 that has perforations 5 with a discontinuous circumference. Perforations 5 also have knobs, ribs, or similar elevations 10 and depressions 11, distributed along more than 180° of their circumference. Mounts 3 have lateral cheeks 13 that terminates at a distance from the optical modulus, represented by the broken lines, established by rods 1 so that the mounts are easy to insert in or remove from the assembled set.

FIG. 4 illustrates another embodiment of a mount 3' with three perforations 5 with a discontinuous circumference. Mount 3' is also easy to insert in or remove from an assembled set.

Like mount 2, the mount 2' illustrated in FIG. 5 has four perforations, which are, however, perforations 5 with a discontinuous circumference. These perforations have, as illustrated in FIG. 6, lateral accesses 14 so that they can be rotated or twisted onto spatially fixed rods 1 like those illustrated in FIG. 1.

FIG. 7 illustrates how the various types of mounts 2, 3, and 3' can be employed on or next to each other and directly fastened to rods 1 in an embodiment that is somewhat more complicated than that in FIG. 1 although illustrated strictly schematically.

I claim:

1. Arrangement for constructing a micro-optic bench, comprising: mounts for holding optical elements and having perforations; rods extending through said perforations, means in said perforations for locking said rods into position on the mounts; said means having positive snap-together fastenings in vicinity of said perforations through the mounts; said fastenings securing the mounts in place on the rods to prevent accidental displacement of said rods without supplementary attachment means; said mounts being axially slidable along said rods, said optical elements being securely held by said mounts; said perforations comprising first perforations having continuous circumferences and second perforations having discontinuous circumferences through the mounts with one side of the perforations open; said perforations having knobs and ribs distributed along their circumference to comprise said snap-together fastenings; said knobs and ribs in said second perforations with a discontinuous circumference being distributed along more than 180° of their circumference; said perforations having area in the mounts sufficiently elastic to ensure a satisfactory snap-together fastening; said second perforations through mounts having a discontinuous circumference for positioning on or taking off the rods after assembly of said arrangement; said second perforations with discontinuous circumference having lateral accesses; said perforations having a shape and size coordinated with the shape and size of a cross-section of round rods to form snap-together fastenings.

2. Arrangement for constructing a micro-optic bench, comprising: mounts for holding optical elements and having perforations; rods extending through said perforations means in said perforations for locking said rods into position on the mounts; said means having positive snap-together fastenings in vicinity of said perforations through the mounts; said fastenings securing the mounts in place on the rods to prevent accidental displacement of said rods without supplementary attachment means; said mounts being axially slidable along said rods, said optical elements being securely held by said mounts; said perforations comprising first perforations having continuous circumferences and second perforations having discontinuous circumferences through the mounts with one side of the perforations open; mounts with said second perforations having discontinuous circumference being mountable on said rods between support mounts on said rods which have said first perforations with continuous circumferences without first removing at least one of said support mounts from said rods; said mounts with said second perforations having discontinuous circumference being also removable from positions on said rods without first removing from said rods at least one of said support mounts between which said mounts with said second perforations having discontinuous circumferences are located.

3. Arrangement for constructing a micro-optic bench, comprising: mounts for holding optical elements and having perforations; rods extending through said perforations, means in said perforations for locking said rods into position on the mounts; said means having positive snap-together fastenings in vicinity of said perforations through the mounts; said fastenings securing the mounts in place on the rods to prevent accidental displacement of said rods without supplementary attachment means; said mounts being axially slidable along said rods, said optical elements being securely held by said mounts; said perforations comprising first perforations having continuous circumferences and second perforations having discontinuous circumferences through the mounts with one side of the perforations open; said perforations having knobs and ribs distributed along their circumference to comprise said snap-together fastenings; said knobs and ribs in said second perforations being distributed along more than 180° of their circumference; said perforations having area in the mounts sufficiently elastic to ensure a satisfactory snap-together fastening; said second perforations with discontinuous circumference having lateral accesses; said perforations having a shape and size coordinated with the shape and size of a cross-section of round rods to form snap-together fastenings; mounts with said second perforations having discontinuous circumferences being mountable on said rods between support mounts on said rods which have said first perforations with continuous circumferences without first removing at least one of said support mounts from said rods; said mounts with said second perforations having discontinuous circumference being also removable from positions on said rods without first removing from said rods at least one of said support mounts between which said mounts with said second perforations are located.

4. Arrangement as defined in claim 2, wherein said perforations have knobs and ribs distributed along their circumference to comprise said snap-together fastenings.

5. Arrangement as defined in claim 4, wherein said knobs and ribs in said second perforations with a discontinuous circumference are distributed along more than 180° of their circumference.

6. Arrangement as defined in claim 2, wherein said perforations have area in the mounts sufficiently elastic to ensure a satisfactory snap-together fastening.

7. Arrangement as defined in claim 1, wherein said perforations with discontinuous circumference have lateral accesses.

8. Arrangement as defined in claim 2, wherein said performances have a shape and size coordinate with the shape and size of a cross-section of round rods to form snap-together fastenings.

* * * * *